US012038185B2

(12) United States Patent
Scholten et al.

(10) Patent No.: US 12,038,185 B2
(45) Date of Patent: Jul. 16, 2024

(54) AIR DUCT ASSEMBLY WITH FIELD ACCESSIBLE PORTS IN COMMUNICATION WITH A PRESSURE SOURCE AND PRESSURE SENSING PORTS IN COMMUNICATION WITH A PRESSURE SENSOR

(71) Applicant: Johnson Controls, Inc., Milwaukee, WI (US)

(72) Inventors: Jean H. Scholten, Roswell, GA (US); Aurimas Aniulis, Atlanta, GA (US); Damon Bryan Smith, Alto, GA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 506 days.

(21) Appl. No.: 17/180,315

(22) Filed: Feb. 19, 2021

(65) Prior Publication Data
US 2021/0172778 A1 Jun. 10, 2021

Related U.S. Application Data

(63) Continuation-in-part of application No. 16/993,812, filed on Aug. 14, 2020, which is a continuation of (Continued)

(51) Int. Cl.
*F24F 11/30* (2018.01)
*F24F 11/49* (2018.01)
(Continued)

(52) U.S. Cl.
CPC ............ *F24F 11/30* (2018.01); *F24F 11/49* (2018.01); *F24F 11/74* (2018.01); *F24F 13/10* (2013.01);
(Continued)

(58) Field of Classification Search
CPC .. G05D 7/00; G01F 5/00; G01F 1/684; G01F 1/40; F24F 2110/40; F24F 13/10; F24F 11/49; F24F 11/74; F24F 11/30
See application file for complete search history.

(56) References Cited

U.S. PATENT DOCUMENTS 3,525,259 A 8/1970 Stough
3,580,238 A 5/1971 Diehl
(Continued)

FOREIGN PATENT DOCUMENTS

CA 2957726 A1 3/2016
CA 3043996 A1 2/2018
(Continued)

OTHER PUBLICATIONS

EP Office Action on EP Appl. Ser. No. 19704123 dated Dec. 20, 2022 (4 pages).
(Continued)

*Primary Examiner* — Paul M. West
(74) *Attorney, Agent, or Firm* — Foley & Lardner LLP

(57) ABSTRACT

An air duct includes a shell, a first annular chamber defined along a circumference of the sidewall and fluidly coupled with an inner volume defined by the shell through multiple first openings, a second annular chamber defined along the circumference of the shell at a longitudinal position downstream of the first annular chamber, and fluidly coupled with the inner volume of the shell through multiple second openings, a first pressure sensing coupler, a second pressure sensing coupler, a first field accessible coupler, and a second field accessible coupler. The first pressure sensing coupler is fluidly coupled with the first annular chamber and the second pressure sensing coupler is fluidly coupled with the second annular chamber for pressure detection. The first and second field accessible couplers are fluidly coupled with the first and second annular chambers for providing pressurized
(Continued)

air to the first annular chamber and the second annular chamber.

20 Claims, 11 Drawing Sheets

Related U.S. Application Data application No. 16/251,011, filed on Jan. 17, 2019, now Pat. No. 10,768,031.

(60) Provisional application No. 62/618,142, filed on Jan. 17, 2018.

(51) Int. Cl.
| | | |
|---|---|---|
| *F24F 11/74* | (2018.01) | |
| *F24F 13/10* | (2006.01) | |
| *G01F 1/40* | (2006.01) | |
| *G05D 7/00* | (2006.01) | |
| *F24F 110/40* | (2018.01) | |
| *G01F 1/684* | (2006.01) | |
| *G01F 5/00* | (2006.01) | |

(52) U.S. Cl.
CPC ............... *G01F 1/40* (2013.01); *G05D 7/00* (2013.01); *F24F 2110/40* (2018.01); *G01F 1/684* (2013.01); *G01F 5/00* (2013.01)

(56) References Cited

U.S. PATENT DOCUMENTS

| | | | |
|---|---|---|---|
| 4,061,266 A * | 12/1977 | Ley, Jr. | .......... F24F 11/72 |
| | | | 236/49.4 |
| D264,375 S | 5/1982 | Prikkel | |
| D264,376 S | 5/1982 | Prikkel | |
| D298,473 S | 11/1988 | Stackhouse et al. | |
| 5,289,819 A | 3/1994 | Kroger et al. | |
| 5,458,148 A | 10/1995 | Zelczer et al. | |
| 5,461,932 A | 10/1995 | Hall et al. | |
| 5,586,861 A | 12/1996 | Berger | |
| 5,720,658 A | 2/1998 | Belusa | |
| 5,876,015 A | 3/1999 | Schaeffer et al. | |
| 5,979,247 A | 11/1999 | Kizawa | |
| 6,099,405 A | 8/2000 | Cunningham, Jr. | |
| 6,164,142 A | 12/2000 | Dimeff | |
| D436,399 S | 1/2001 | Poland | |
| 6,192,922 B1 | 2/2001 | MacGibbon et al. | |
| 6,253,624 B1 | 7/2001 | Broden et al. | |
| 6,311,568 B1 | 11/2001 | Kleven | |
| 6,324,917 B1 | 12/2001 | Mack et al. | |
| 6,450,043 B1 | 9/2002 | Kolkebeck et al. | |
| D488,858 S | 4/2004 | Stout | |
| D489,806 S | 5/2004 | Stout | |
| 6,912,919 B2 | 7/2005 | Shiba et al. | |
| 7,275,533 B2 | 10/2007 | Soeholm et al. | |
| 7,392,826 B2 | 7/2008 | Schub et al. | |
| 8,430,731 B2 | 4/2013 | Bamberger | |
| 9,068,867 B2 | 6/2015 | Ayers et al. | |
| 9,255,721 B2 | 2/2016 | Donohue | |
| D757,919 S | 5/2016 | Kimura | |
| 9,447,985 B2 | 9/2016 | Johnson | |
| 9,459,126 B2 | 10/2016 | Verhaagen et al. | |
| D771,234 S | 11/2016 | Smith et al. | |
| 9,506,668 B2 | 11/2016 | Sinur et al. | |
| 9,512,925 B2 | 12/2016 | Shanker et al. | |
| 9,581,347 B2 | 2/2017 | Fiorita | |
| 9,605,856 B2 | 3/2017 | Coogan | |
| 9,964,421 B1 | 5/2018 | Buckley et al. | |
| 10,060,617 B2 | 8/2018 | Horng et al. | |
| 10,174,847 B2 | 1/2019 | Kabierschke et al. | |
| 10,260,537 B2 | 4/2019 | Sawchuk | |
| 10,365,143 B2 | 7/2019 | Sawchuk et al. | |
| 10,451,461 B2 | 10/2019 | Nesbitt et al. | |
| 10,768,031 B2 | 9/2020 | Scholten | |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 11,499,855 B2 | 11/2022 | Mekias | |
| 11,578,885 B2 | 2/2023 | Wennerstrã-M | |
| 11,713,986 B2 | 8/2023 | Ming | |
| 2004/0238046 A1 | 12/2004 | Hoffman et al. | |
| 2006/0234621 A1 | 10/2006 | Desrochers et al. | |
| 2008/0307896 A1 | 12/2008 | Ifft et al. | |
| 2009/0126382 A1 | 5/2009 | Rubino et al. | |
| 2013/0245836 A1 | 9/2013 | Goodfellow | |
| 2014/0124057 A1 | 5/2014 | Freund et al. | |
| 2014/0260692 A1 | 9/2014 | Sharp | |
| 2015/0253781 A1 | 9/2015 | Ashton et al. | |
| 2015/0354845 A1 | 12/2015 | Brown et al. | |
| 2016/0103003 A1 | 4/2016 | Hering | |
| 2016/0252265 A1 | 9/2016 | Omura et al. | |
| 2016/0263967 A1 | 9/2016 | Schaake | |
| 2017/0248237 A1 | 8/2017 | Kabierschke et al. | |
| 2017/0254557 A1 | 9/2017 | Chiu | |
| 2019/0137126 A1 | 5/2019 | Desrochers | |
| 2019/0219300 A1 | 7/2019 | Scholten et al. | |
| 2020/0240674 A1 | 7/2020 | Howe et al. | |
| 2021/0018215 A1 | 1/2021 | Scholten et al. | |
| 2021/0172779 A1 | 6/2021 | Scholten | |
| 2022/0155111 A1 | 5/2022 | Redmond et al. | |
| 2022/0316927 A1 | 10/2022 | Hohlfeld et al. | |

FOREIGN PATENT DOCUMENTS

| | | |
|---|---|---|
| CN | 201100426 Y | 8/2008 |
| CN | 201184422 Y | 1/2009 |
| CN | 101566237 A | 10/2009 |
| CN | 201688962 U | 12/2010 |
| CN | 103968145 A | 8/2014 |
| DE | 19717335 | 11/1997 |
| EP | 1 783 409 A1 | 5/2007 |
| EP | 2 508 815 A1 | 10/2012 |
| EP | 3 186 687 A4 | 7/2017 |
| EP | 3 497 377 A1 | 6/2019 |
| FR | 2748308 A1 | 11/1997 |
| GB | 0 955 502 A | 4/1964 |
| JP | H01-311911 A1 | 12/1989 |
| JP | 5604093 B2 | 10/2014 |
| JP | 2018-076008 A | 5/2018 |
| KR | 1318139 B1 | 10/2013 |
| WO | WO-2017/183365 A1 | 10/2017 |

OTHER PUBLICATIONS

CN Office Action with Search Report on CN Appl. Ser. No. 201980018253.2 dated Apr. 8, 2022, with translation (48 pages).

6" Universal Automatic Make-Up Air Damper with Pressure Sensor Kit, posted on [Sep. 5, 2012] [online], [retrieved Apr. 19, 2023]. Retrieved from internet, https://www.amazon.com/Universal-Automatic-Make-Up-Damper-Pressure/dp/B00R8MQHW8/ (Year: 2012).

RS-2000 True Round Smoke Damper, posted on [retrieved Apr. 18, 2023]. Retrieved from internet, https://www.johnsoncontrols.com/hvac-equipment/air-distribution/dampers-and-louvers/dampers/rs-2000 (Year: 2023).

Foreign Action other than Search Report on CN 201980018253.2, dated Jul. 27, 2021, 19 pages.

CN Office Action on CN Appl. Ser. No. 201980018253 dated Oct. 10, 2022 (11 pages).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-

(56) References Cited

OTHER PUBLICATIONS

Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
CN Office Action on CN Appl. Ser. No. 202130453857.X dated Aug. 14, 2023 (3 pages).

\* cited by examiner

Section B-B

Detail D-D

Detail C-C

AIR DUCT ASSEMBLY WITH FIELD ACCESSIBLE PORTS IN COMMUNICATION WITH A PRESSURE SOURCE AND PRESSURE SENSING PORTS IN COMMUNICATION WITH A PRESSURE SENSOR

CROSS-REFERENCE TO RELATED PATENT APPLICATIONS

This application is a continuation in part of U.S. application Ser. No. 16/993,812, filed Aug. 14, 2020, which is a continuation of U.S. application Ser. No. 16/251,011, filed Jan. 17, 2019, which claims benefit of and priority to U.S. Provisional Application No. 62/618,142, filed Jan. 17, 2018, the entire disclosures of which are incorporated by reference herein.

BACKGROUND

The present disclosure relates, in exemplary embodiments, to air duct airflow sensors. Air dampers are mechanical valves used to permit, block, and control the flow of air in air ducts. Typically, a pressure sensor is incorporated to detect and measure the air pressure in the air duct. Pressure measurement can be used to determine the desire amount of airflow and to actuate a damper to open or close, thus affecting airflow.

It would be desirable to have an airflow sensor that would not be dependent on airflow orientation so as to permit location of sensor closer to a bend in the air duct than conventional sensors can be positioned. It would be desirable to have an airflow sensor less susceptible to clogging.

SUMMARY

One implementation of the present disclosure is an air duct, according to some embodiments. The air duct includes a shell, a first annular chamber, a second annular chamber, a first pressure sensing coupler, a second pressure sensing coupler, a first field accessible coupler, and a second field accessible coupler. The first annular chamber is defined along a circumference of the shell and fluidly coupled with an inner volume that is defined by the shell through multiple first openings. The second annular chamber is defined along the circumference of the shell at a longitudinal position downstream of the first annular chamber, and is fluidly coupled with the inner volume of the shell through multiple second openings. The first pressure sensing coupler is fluidly coupled with the first annular chamber and the second pressure sensing coupler is fluidly coupled with the second annular chamber for pressure detection. The first field accessible coupler is fluidly coupled with the first annular chamber and the second field accessible coupler is fluidly coupled to the second annular chamber for providing pressurized air to the first annular chamber and the second annular chamber.

In some embodiments, the shell is a cylindrical hollow member.

In some embodiments, the second annular chamber is positioned at a throat of the shell, the throat defining a restricted cross-sectional flow area of the shell.

In some embodiments, the air duct further includes a first annular gasket and a second annular gasket. The first annular gasket is sealingly coupled with a radially outwards facing surface of the shell to define the first annular chamber between one or more interior surfaces of the first annular gasket and the radially outwards facing surface of the shell, according to some embodiments. The second annular gasket is sealingly coupled with the radially outwards facing surface of the shell to define the second annular chamber between one or more interior surfaces of the second annular gasket and the radially outwards facing surface of the shell, according to some embodiments.

In some embodiments, the first and second field accessible couplers are each open to and accessible from an exterior of the air duct.

In some embodiments, the first and second field accessible couplers are configured to fluidly couple with a pressure source configured to provide the pressurized air to flow through the first annular chamber and the multiple first openings to clear obstructions. In some embodiments, the pressure source is configured to provide the pressurized air to flow through the second annular chamber and the multiple second openings to clear obstructions.

In some embodiments, the first and second pressure sensing couplers are fluidly coupled with a pressure sensor of the air duct for detecting pressure values or a pressure differential between the first and second pressure sensing couplers.

In some embodiments, air flowing through the air duct flows through the multiple first openings, the first annular chamber, the second annular chamber, and the first and second pressure sensing couplers in a first direction for pressure detection. In some embodiments, the pressurized air flows through the multiple second openings, the first and second field accessible couplers, the first annular chamber, and the second annular chamber in a direction opposite the first direction for cleaning.

In some embodiments, the air duct further includes a damper and an actuator. In some embodiments, the actuator is configured to drive the damper to adjust a flow rate of air through the air duct.

Another implementation of the present disclosure is an air duct, according to some embodiments. In some embodiments, the air duct includes a shell, a first annular chamber, a second annular chamber, and a field accessible coupler. In some embodiments, the first annular chamber is defined along a circumference of the shell and is fluidly coupled with an inner volume of the shell through multiple first openings. In some embodiments, the second annular chamber is defined along the circumference of the shell at a longitudinal position that is downstream of the first annular chamber. In some embodiments, the second annular chamber is fluidly coupled with the inner volume of the shell through multiple second openings. In some embodiments, the field accessible coupler is fluidly coupled with the first annular chamber or the second annular chamber for providing pressurized air to the first annular chamber or the second annular chamber. In some embodiments, the second annular chamber is partially defined by an annular groove extending circumferentially along the shell, the annular groove extending inwards towards a longitudinal axis of the air duct.

In some embodiments, the second annular chamber is positioned at the annular groove of the shell.

In some embodiments, the air duct further includes a first annular gasket, and a second annular gasket. In some embodiments, the first annular gasket is sealingly coupled with a radially outwards facing surface of the shell to define the first annular chamber between one or more interior surfaces of the first annular gasket and the radially outwards facing surface of the shell. In some embodiments, the second annular gasket is sealingly coupled with the radially outwards facing surface of the shell to define the second annular chamber between one or more interior surfaces of the second annular gasket and the radially outwards facing surface of the shell.

In some embodiments, the field accessible coupler is a first field accessible coupler fluidly coupled with the first annular chamber and the air duct further comprises a second field accessible coupler fluidly coupled with the second annular chamber, wherein the first field accessible coupler and the second field accessible coupler are configured to fluidly coupled with a pressure source.

In some embodiments, the pressure source is configured to provide the pressurized air to flow through the first annular chamber and the multiple first openings to clear obstructions. In some embodiments, the pressure source is also configured to provide the pressurized air to flow through the second annular chamber and the multiple second openings to clear obstructions.

In some embodiments, the air duct further includes first and second pressure sensing couplers that are independently fluidly coupled with the first annular chamber and the second annular chamber and a pressure sensor of the air duct for detecting pressure values or a pressure differential between the first annular chamber and the second annular chamber.

In some embodiments, the shell is a cylindrical hollow member including the annular groove.

In some embodiments, the annular groove defines a restricted cross-sectional flow area of the shell along the annular groove.

Another implementation of the present disclosure is a method for cleaning an air duct, according to some embodiments. In some embodiments, the method includes providing an air duct including an inner volume, first and second independent annular chambers that independently fluidly couple with the inner volume through a first set of openings and second set of openings, and first and second field accessible couplers. In some embodiments, the method includes fluidly coupling at least one of the first and second field accessible couplers with a pressure source. In some embodiments, the method further includes providing pressurized air through at least one of: (1) the first field accessible couplers, the first independent annular chamber, and the first set of openings, or (2) the second field accessible coupler, the second annular chamber, and the second set of openings.

In some embodiments, the air duct further includes first and second pressure sensing couplers. In some embodiments, the method further includes adjusting a position or configuration of the damper to control a flow rate of air through the air duct and detecting a pressure differential between longitudinal positions of the first and second annular chambers using the first and second pressure sensing couplers and a pressure sensor.

In some embodiments, the first and second pressure sensing couplers are independently fluidly coupled with the first and second annular chambers at a first radial position, and the first and second field accessible couplers are independently fluidly coupled with the first and second annular chambers at a second radial position. In some embodiments, air is configured to flow through the inner volume, the first set of openings and the second set of openings, the first and second independent annular chambers, and the first and second pressure sensing couplers in a first direction for pressure detection. In some embodiments, air is configured to flow through the first and second field accessible couplers, the first and second annular chambers, the first set of openings and the second set of openings, to the inner volume in a second direction that is opposite the first direction for clearing obstructions.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangements of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
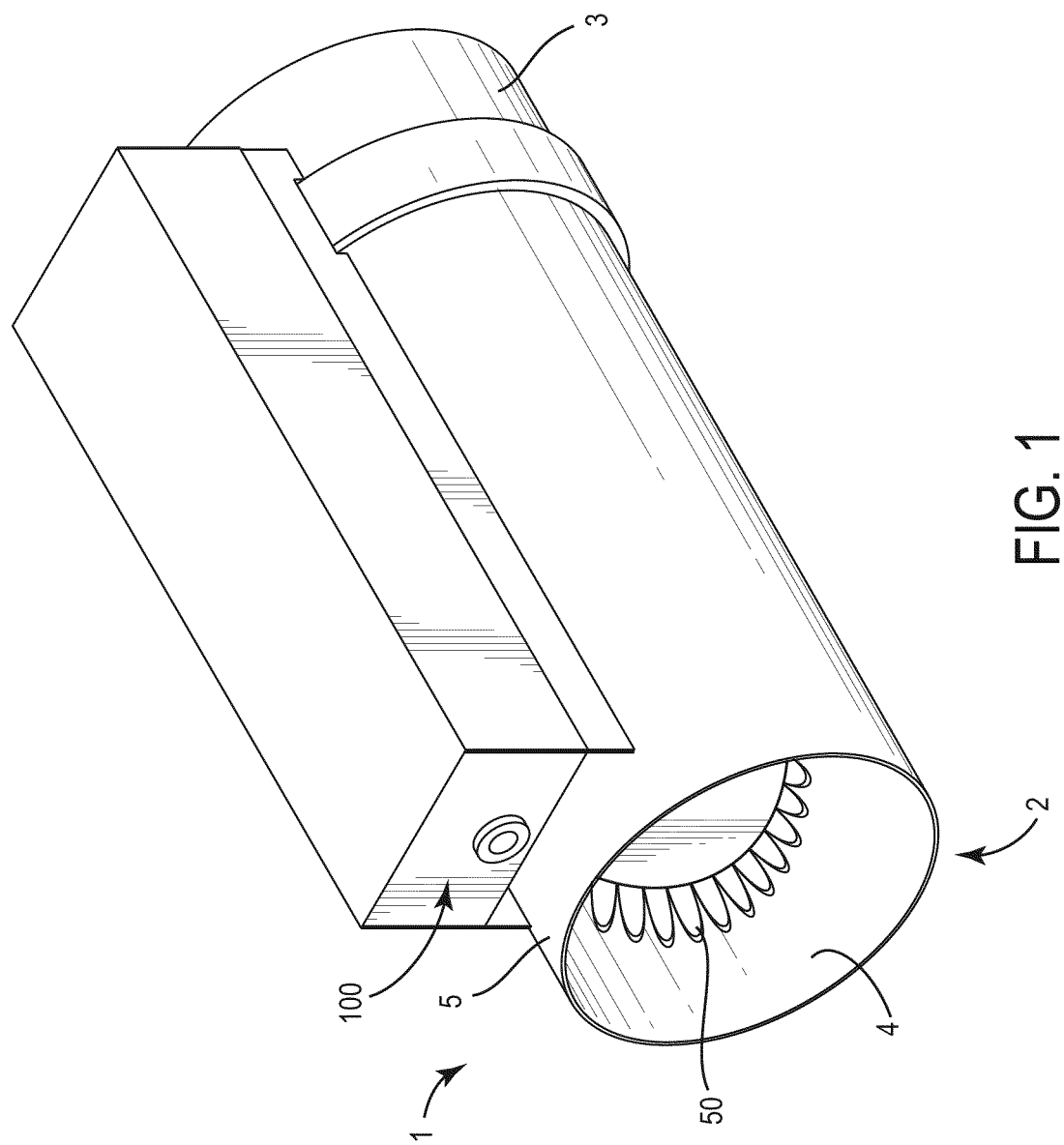
FIG. 1 is an isometric view of an air duct assembly, according to some embodiments.

FIG. 1 depicts an isometric view of a cylindrical air duct assembly 1. As shown, the air duct assembly 1 includes a first end 2, a second end 3, and interior wall 4, an exterior wall 5, and a control assembly 100. Air duct assembly 1 is further shown to include an air damper assembly 50 situated within the interior wall 4 to control the volume of air flowing through the cylindrical air duct assembly 1. In some embodiments, the diameter of the interior wall 4 is approximately 10 inches.

Figure 2:
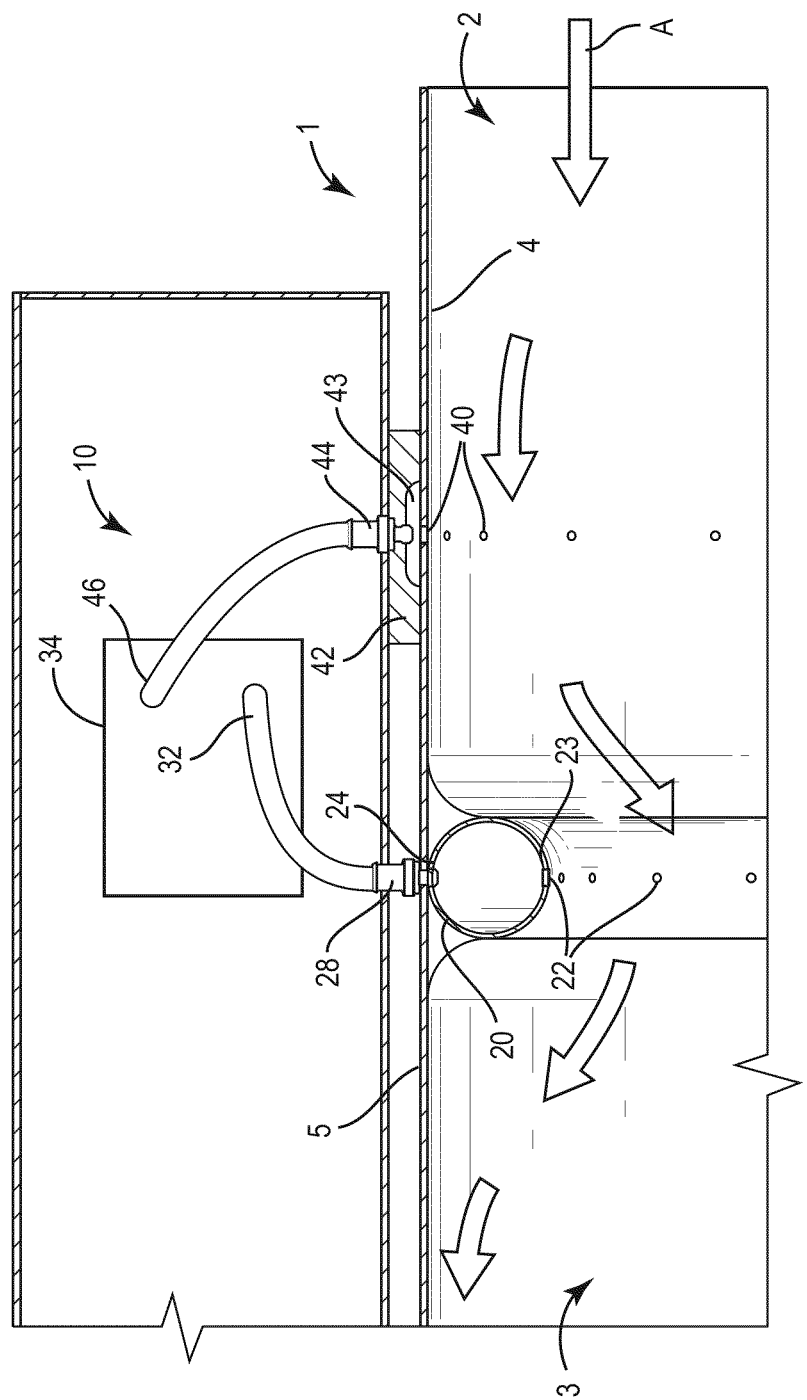
FIG. 2 is a side cross-sectional view of an air duct airflow sensor assembly, according to some embodiments.
Figure 3:
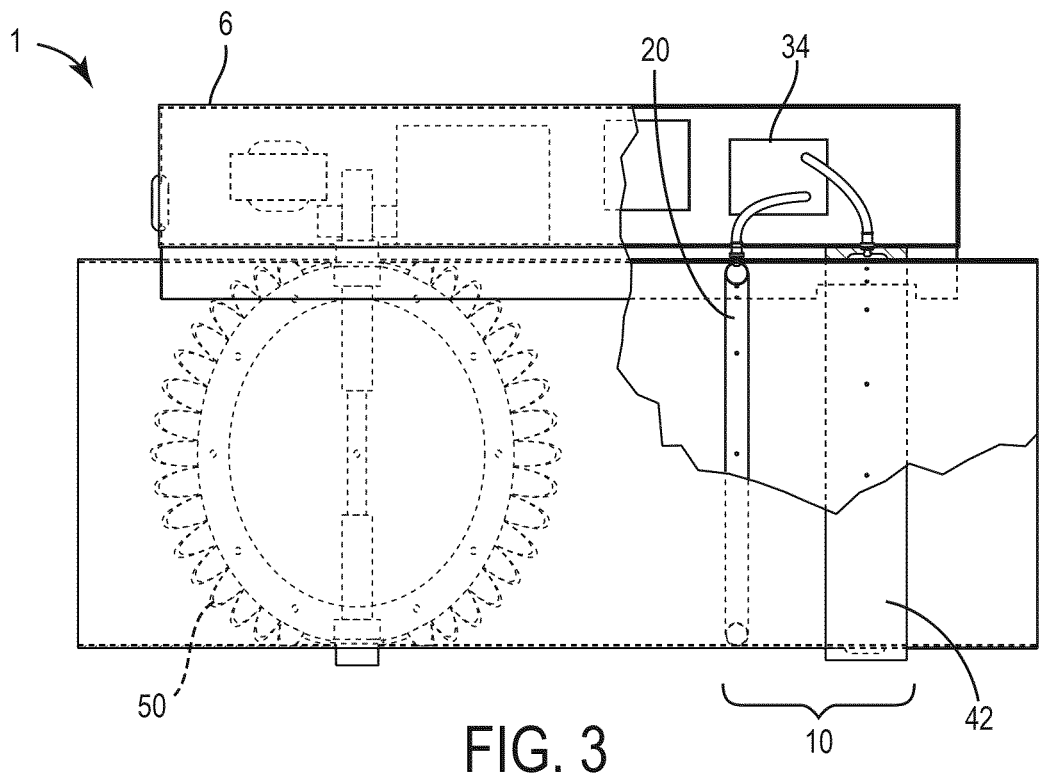
FIG. 3 is a side cutaway view of the air duct assembly of FIG. 1, according to some embodiments.
Figure 4:
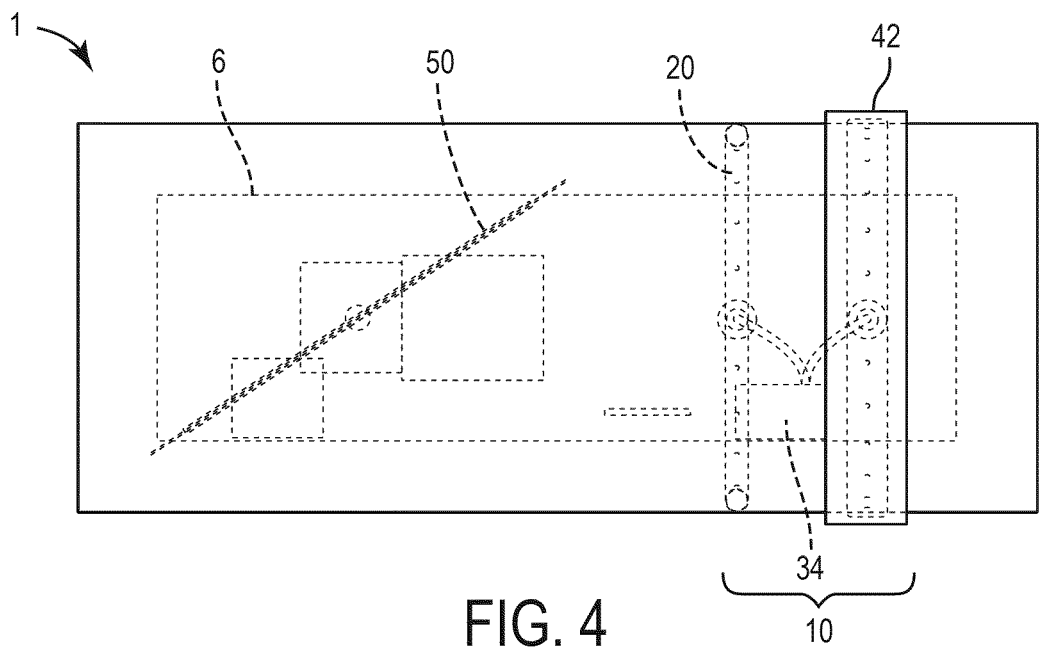
FIG. 4 is a top elevation view of the air duct assembly of FIG. 1, according to some embodiments.
Figure 5:
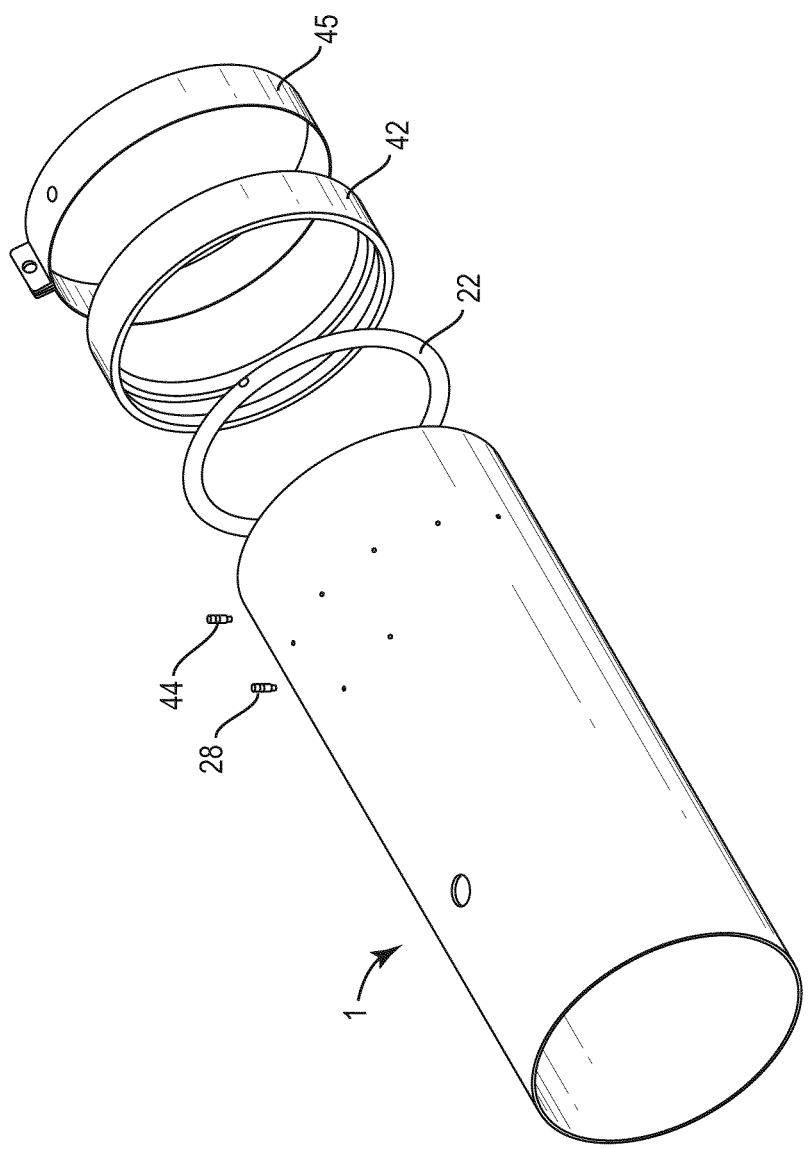
FIG. 5 is an exploded perspective view of an air duct, ring and gasket components that can be utilized in the air duct assembly of FIG. 1, according to some embodiments.
Figure 6:
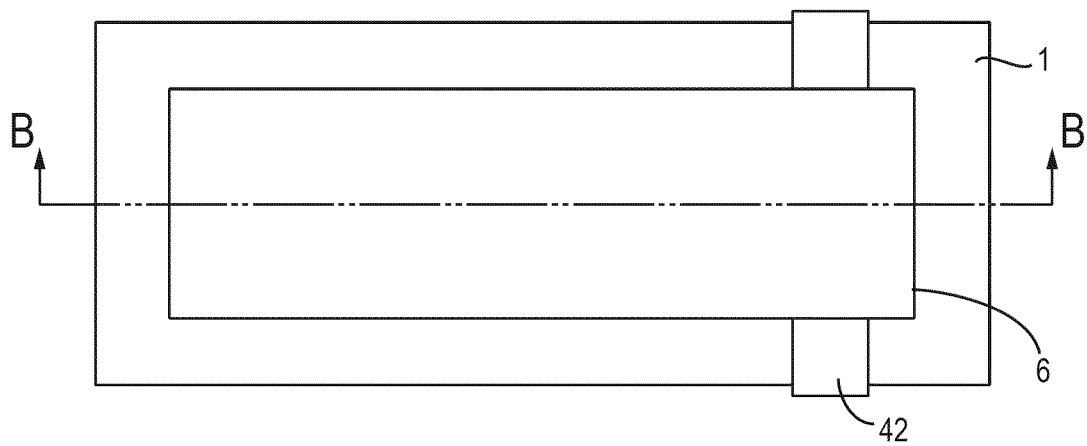
FIG. 6 is another top view of the air duct assembly of FIG. 1, according to some embodiments.
Figure 7:
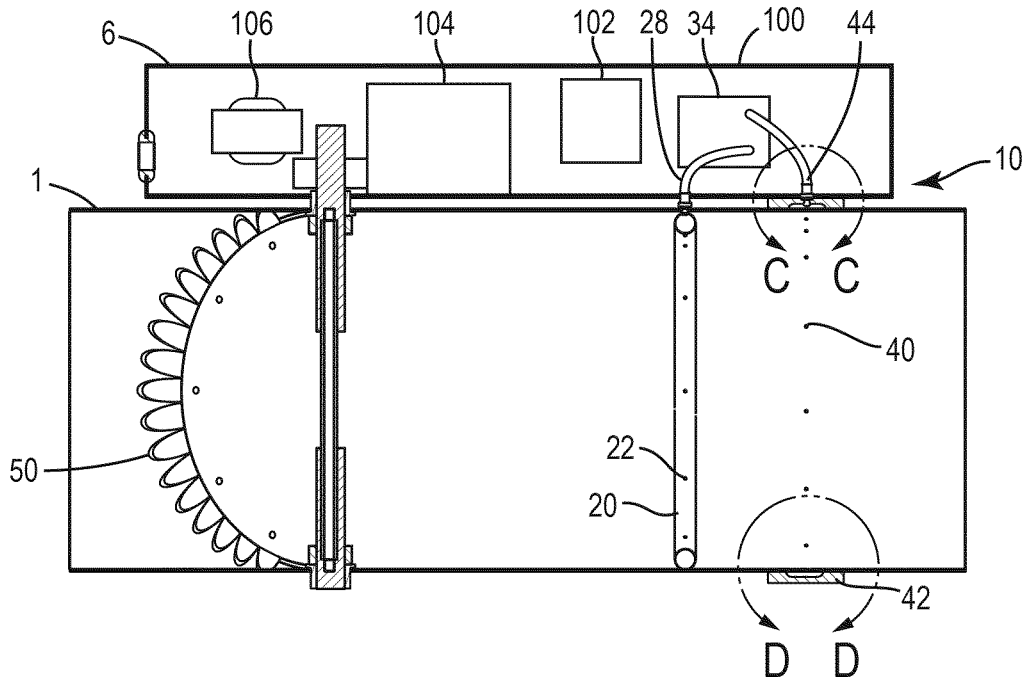
FIG. 7 is a side cross-sectional view of the air duct assembly taken along the line B-B of FIG. 6, according to some embodiments.
Figure 9:
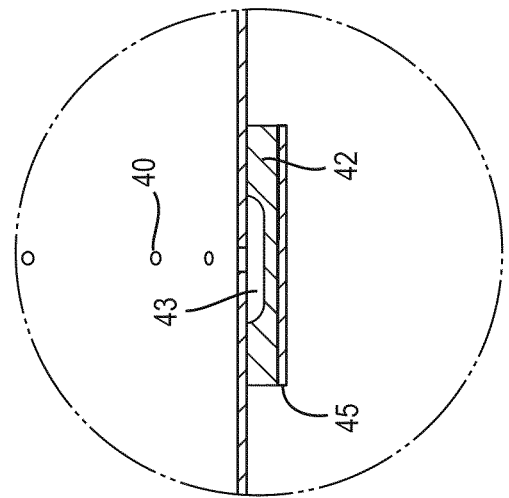
FIG. 9 is a detail view D-D of the gasket, according to some embodiments.
Figure 8:
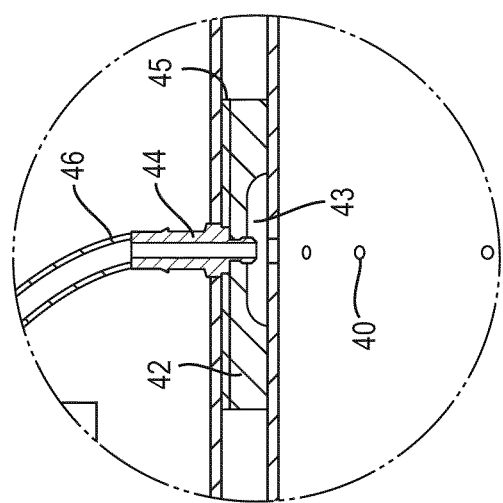
FIG. 8 is a detail view C-C of the nipple, gasket and tube, according to some embodiments.

Referring now to FIGS. 2-9, various views depicting the air duct airflow sensor assembly 10 are shown, according to some embodiments. Air may flow through the air duct airflow sensor assembly 10 in the direction indicated by arrow "A" as shown in FIG. 2. The air duct airflow sensor assembly 10 includes a low pressure detection device and a high pressure detection device. The low pressure detection device comprises a hollow ring 20 which is mounted to or otherwise associated with the interior wall 4. In some embodiments, the outer diameter of the hollow ring 20 can range from 0.5 inches to 0.75 inches. In an exemplary embodiment, the outer diameter of the hollow ring 20 is 0.625 inches. The ring 20 has a plurality of apertures 22 defined in the inner periphery 23 of the ring (versus the outer periphery 24 which is proximate to the interior wall 4). In exemplary embodiments, the apertures 22 are disposed in the inner periphery of the ring 20 such that they are generally orthogonal to the orientation of airflow, so that air flows across the apertures 22, rather than flowing into the apertures 22.

A hollow connector nipple 28 is connected to an aperture defined in the ring 20 and an aperture defined in the duct 1. A tube 32 is connected to the nipple 28. Air flowing into the apertures 22 can flow through the ring 20, into the nipple 28, and through the tube 32. The tube 32 is connected to a pressure sensor 34 such that the air flowing through the tube 32 is received and detected by the flow pressure sensor 34. The ring 20 serves two purposes: as an air collection device, and as an airflow restriction obstacle, so as to create a measurable pressure differential.

The air duct 1 further includes multiple apertures 40 defined therein, the apertures 40 being arranged generally in a ring-shape around the interior wall 4. A gasket 42 is associated with the exterior wall 5 and is located generally over the apertures 40. The gasket 42 has a recessed area 43 such that when associated with the exterior wall 5 a chamber 43 is formed. Detail views of the apertures 40 and chamber 43 are specifically depicted in FIGS. 8 and 9.

A hollow connector nipple 44 is connected to the gasket 42. In exemplary embodiments, a gasket guarding ring 45 may be used and is fitted over the gasket 42. A tube 46 is connected to the nipple 44. The tube 46 is connected to the pressure sensor 34. In an alternative exemplary embodiment, a separate pressure sensor (not shown) can be connected to the tube 46. The apertures 40, gasket 42, nipple 44, tube 46 and pressure sensor 34 form a high pressure sensor detection device.

In exemplary embodiments, the pressure sensor 34 is part of a control assembly 6 that controls the opening and closing of a damper 50. In one exemplary embodiment of a control assembly, specifically depicted in FIG. 7, a housing 100 is mounted to or otherwise associated with the air duct. A sensor 34, processor 102, actuator 104 and power supply 106 may be disposed within the housing 100. A damper 50 is in operational communication with the actuator 104.

In operation, air flowing through the duct 1 in the direction of arrow A first encounters the high pressure detection apertures 40. A portion of the air enters the apertures 40 and flows into the chamber 43. The air then moves into the tube 46 via the nipple 44, and then into the pressure sensor 34. The pressure detected is the "high" pressure in the duct 1, i.e., the pressure upstream from the airflow restrictor which is the ring 20.

Air flowing through the duct 1 next flows over the ring 20 and can enter the apertures 22 and travel through the nipple 28 and the tube 32, and into the pressure sensor 34. The pressure detected is the "low" pressure in the duct, i.e., the pressure at the point where airflow is restricted by the ring 20. The differential between the high pressure measurement and the low pressure measurement is an indication of the air velocity through the duct, specifically a scaled square root of the measured pressure (i.e., an application of Bernoulli's principle). The sensor 34 can send a signal to the control assembly 6 that in turn can cause the damper 50 to rotate so as to open or close the air duct 1.

In exemplary embodiments, the pressure sensor 34 is a "dead-end" pressure sensor (versus a flow-through sensor); i.e., after the initial pressure is established no further airflow goes through the sensor. This can reduce the chance of the apertures 22 and 40 becoming clogged.

In one exemplary embodiment, for an air duct having a 10 inch diameter, a 0.5 inch diameter ring 20 was used. With such a construction measurements of 850 CFM (cubic feet per minute) down to 35 CFM were obtainable with a 0.1 in Wg duct static. In other embodiments, a 0.625 inch diameter ring 20 may be utilized.

A benefit of the presently described sensor assembly is that because of the ring 20 design having the apertures 22 orthogonal to the airflow orientation, air to be diverted into the ring 20 flows over the apertures 22, rather than directly into the apertures 22. This can reduce the likelihood of the apertures 22 becoming clogged by dust, dirt and debris that accompanies the airstream.

Another benefit is that the presently disclosed apparatus is not dependent on airflow orientation. Typically, conventional pressure sensor apparatus, such as variable air volume ("VAV") boxes, are dependent on airflow orientation, and having a bend or other transition in the duct in the general area where the sensor can result in inaccurate measurement due to the airflow disruption that naturally occurs proximate to the bend. With the air detection means of the presently disclosed apparatus, which is not airflow orientation dependent, the sensor assembly can be located closer to a bend or other transition in the air duct without affecting pressure measurement. This provides the duct system designer with greater flexibility in designing the placement of the valve assembly.

Another benefit of the presently described sensor assembly is that it presents minimal obstruction to the airflow and thus allows for greater CFM velocity at lower duct statics. Additionally, in the event any of the apertures 22 become blocked, it is easy to carry out periodic maintenance by disconnecting the sensor 34 and introducing a blast of compressed air into the tube 32 or tube 46. Any clogging debris will be blown out of the apertures 22 or 40, respectively.

Another benefit of the presently described sensor assembly as part of an overall sensor/controller/damper design is that it can operate off of a 0-10V control signal to provide the desired airflow. This allows a designer or operator to set a required CFM with a linear control signal from a control system.

Figure 10:
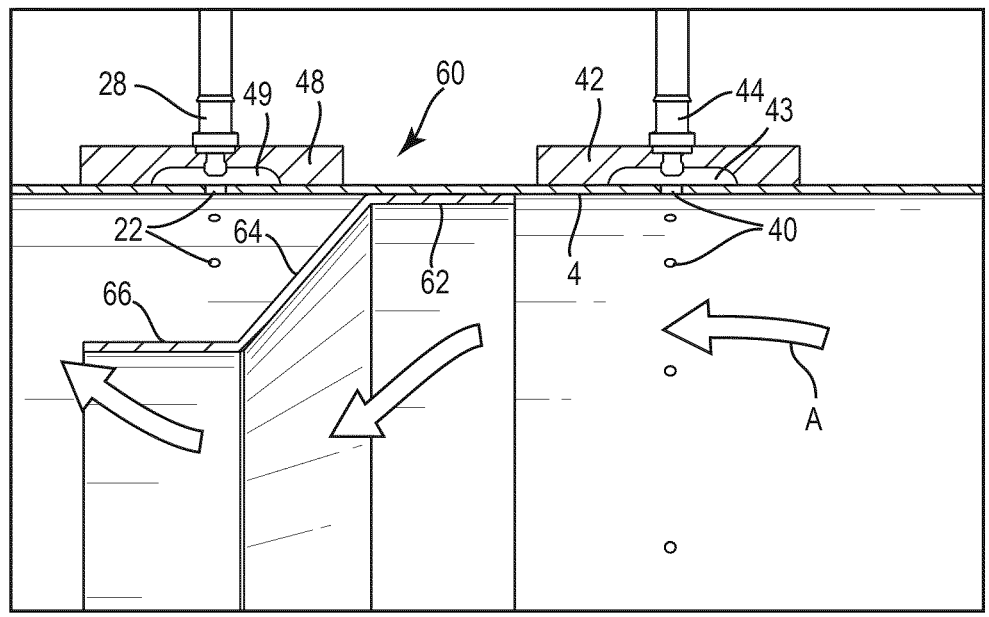
FIG. 10 is a side cross-sectional view of another air duct airflow sensor assembly, according to some embodiments.
Figure 11:
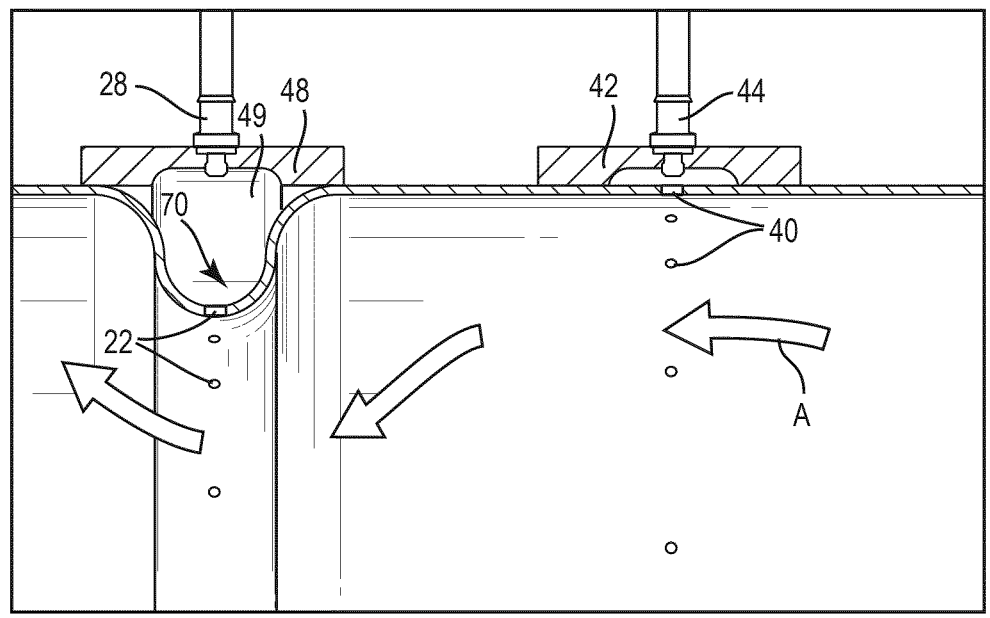
FIG. 11 is a side cross-sectional view of another air duct airflow sensor assembly, according to some embodiments.

Referring now to FIGS. 10 and 11, alternate embodiments for airflow restriction used in the low pressure detection device are depicted. Specifically, FIG. 10 depicts an airflow sensor assembly including a shroud component 60. In some embodiments, the shroud component 60 can be ring-shaped, with an interior wall attachment portion 62, an inclined portion 64, and an aperture shielding portion 66, although any suitable shroud configuration or geometry may be utilized. In some embodiments, the aperture shielding portion 66 extends from the interior wall 4 a distance ranging from 0.5 inches to 0.75 inches.

The aperture shielding portion 66 is situated proximate apertures 22 disposed within the air duct 1. A gasket 48 is associated with the exterior wall 5 and is located generally over the apertures 22. In some embodiments, one or more gasket guarding rings (not shown) may be used and fitted over the gaskets 42, 48. The gasket 48 has a recessed area 49 such that when associated with the exterior wall 5 a chamber 49 is formed. Air flowing through the duct 1 flows over the interior wall attachment portion 62, the inclined portion 64, and the aperture shielding portion 66 of the shroud component 60 and can enter the apertures 22. The air can then travel through the chamber 49 into the nipple 28. Similar to the pressure measurement process described above with reference to FIGS. 1-9, after passing through the nipple 28, the air can travel through a tube and into a pressure sensor for the purpose of controlling an air damper assembly.

Turning now to FIG. 11, an airflow sensor assembly including a channel feature 70 is depicted. Similar to the shroud component 60 described above with reference to FIG. 10, the channel feature 70 may be utilized as an air restriction feature in place of the hollow ring 20 described above with reference to FIGS. 1-9. The channel feature 70 can include multiple apertures 22 distributed about a periphery of the channel feature 70. In some embodiments, the depth of the channel feature 70 can range from 0.5 inches to 0.75 inches. In an exemplary embodiment, the depth of the channel feature 70 is 0.625 inches. In other words, if the air duct 1 is nominally 10 inches in diameter, the diameter may expand to 11.25 inches in the region of the channel feature 70.

A gasket 48 is associated with the exterior wall 5 and is located generally over the apertures 22. In some embodiments, one or more gasket guarding rings (not shown) may be used and fitted over the gaskets 42, 48. The gasket 48 has a recessed area 49 such that when associated with the exterior wall 5 a chamber 49 is formed. Air flowing through the duct 1 flows over the channel feature 70 and can enter the apertures 22. The air can then travel through the chamber 49 into the nipple 28. Similar to the pressure measurement process described above with reference to FIGS. 1-9, after passing through the nipple 28, the air can travel through a tube and into a pressure sensor for the purpose of controlling an air damper assembly.

Figure 12:
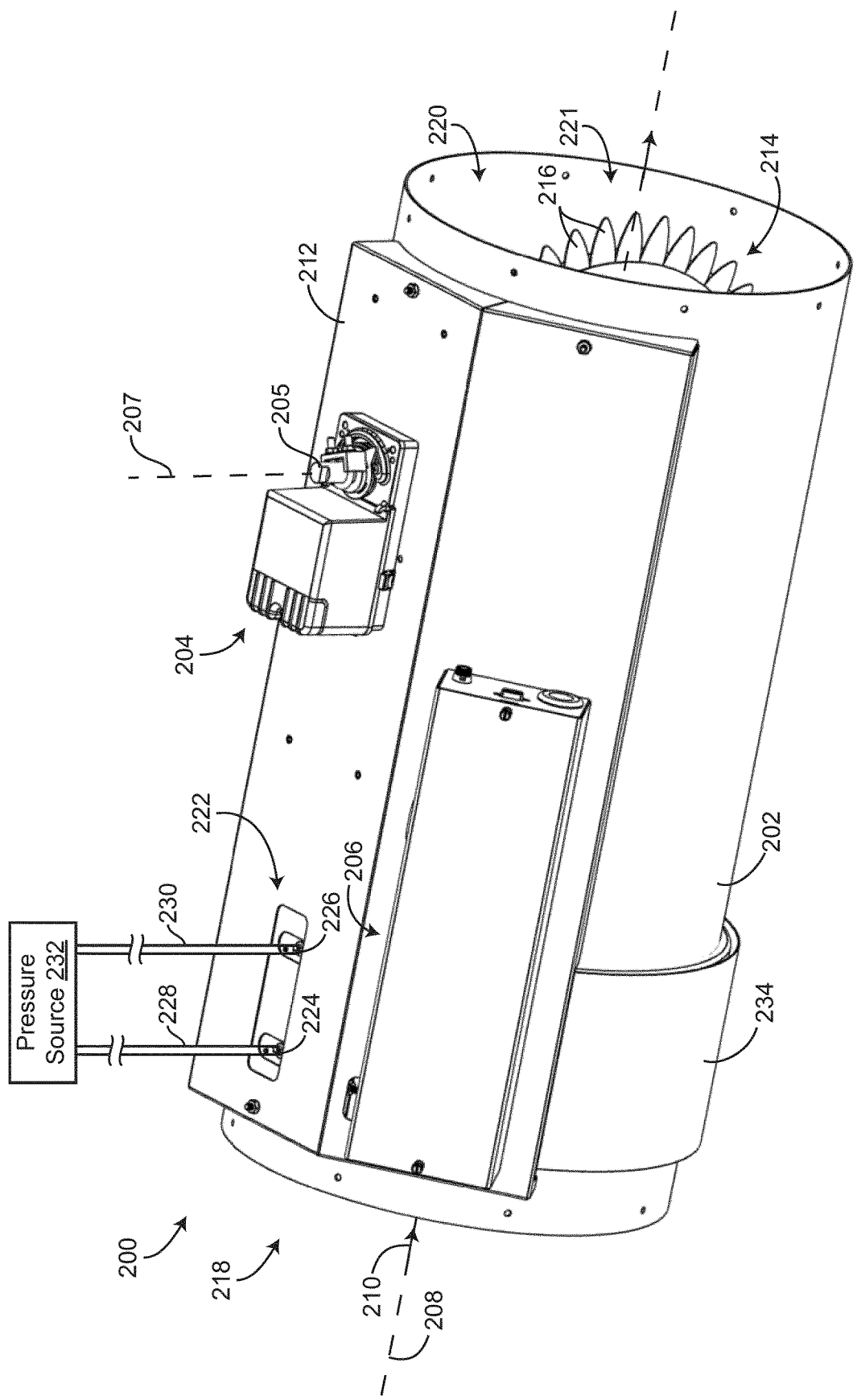
FIG. 12 is a perspective view of another air duct assembly, according to some embodiments.
Figure 13:
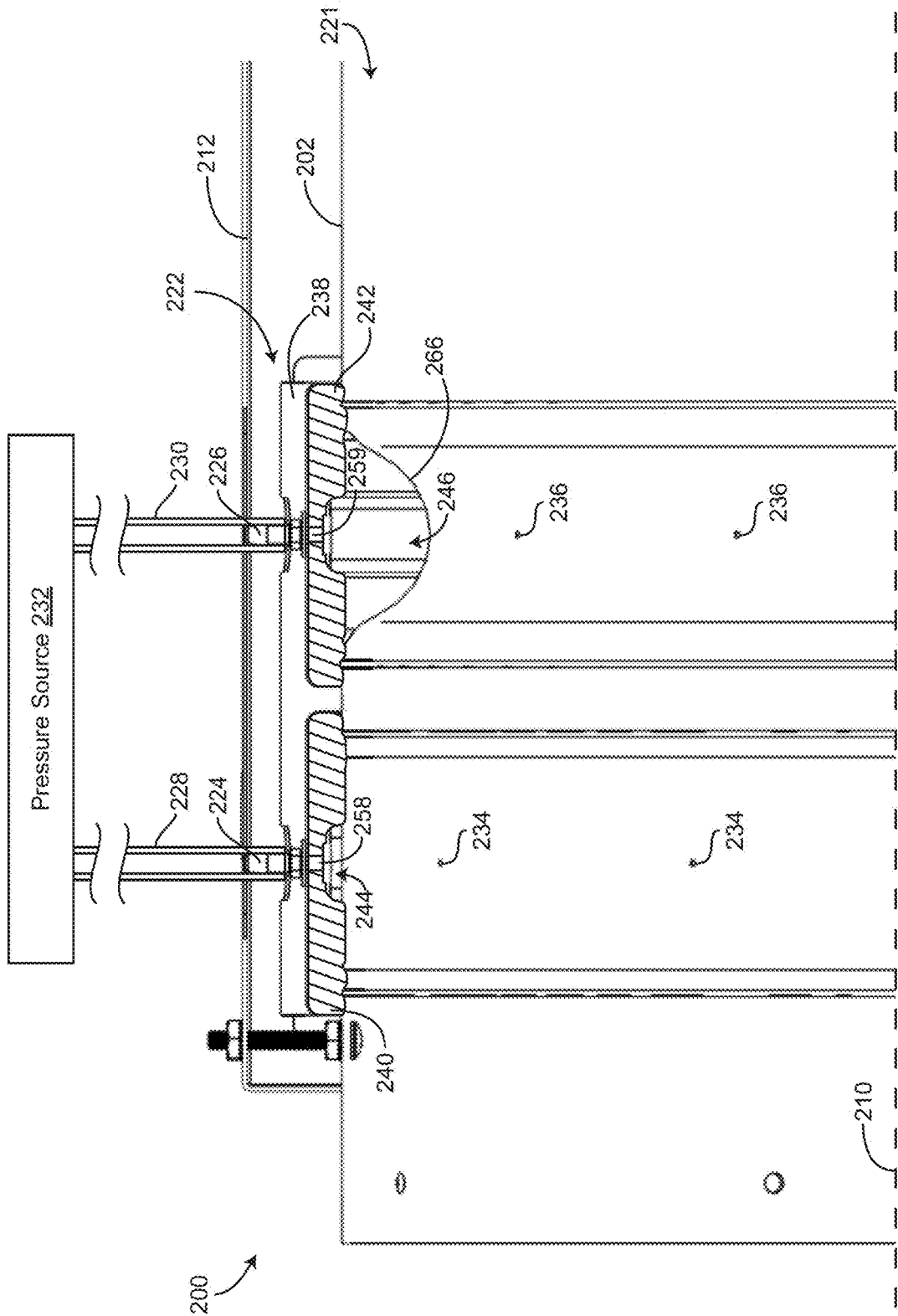
FIG. 13 is a sectional view of a portion of the air duct assembly of FIG. 12, according to some embodiments.

Referring now to FIGS. 12-13, another air duct assembly, shown as valve 200 can be configured to include one or more field accessible ports 222, according to another embodiment. The valve 200 can be the same as or similar the air duct assembly 1 as described in greater detail above with reference to FIGS. 1-11 and may include any of the features, geometry, components, etc., of the air duct assembly 1. For example, the valve 200 can include a damper 214 that is the same as or similar to the damper 50 of the air duct assembly 1. The valve 200 can also include a housing within which an actuator 204 is positioned, similar to the housing 100 and the actuator 104. The valve 200 can also include any of the pressure sensor 34, the processor 102, and the power supply 106.

The valve 200 can include a shell, a body, a tubular member, a duct wall, etc., shown as shell 202. The shell 202 may define a radially inwards facing surface and a radially outwards facing surface and may have a thickness. The shell 202 can also define an inner volume 221 of the valve 200 through which air or a fluid can flow. The valve 200 can include an inlet opening 218 and an outlet opening 220 such that air or fluid flowing through the inner volume 221 of the valve 200 enters the valve 200 through the inlet opening 218, flows through the inner volume 221 of the shell 202 and exits the valve 200 through the outlet opening 220. The valve 200 or the shell 202 may define a longitudinal axis 210, thereby defining a longitudinal direction. The longitudinal axis 210 may extend through a cross-sectional center of the valve 200 or the shell 202.

The actuator 204 can be configured to drive a shaft 205 to rotate about an axis 207. The axis 207 can extend in a radial direction through the longitudinal axis 210. The shaft 205 can be rotatably coupled with the shell 202 of the valve 200 on either radial side of the shell 202. The damper 214 can be fixedly coupled with the shaft 205 such that rotation of the shaft 205 drives rotation of the damper 214. The damper 214 can include a plurality of fingers 216 or sealing member that are configured to seal with the radially inwards facing surface of the shell 202 when the damper 214 is driven to an extremum rotational position. In this way, the damper 214 can be operated to substantially seal or close off the inner volume 221 of the shell 202 so that air or another fluid is limited from flowing therethrough. The damper 214 can also be configured to partially engage the radially inwards facing surface of the shell 202 to provide a limited or a reduced flow area through which the air or fluid flowing through the inner volume 221 of the shell 202 passes.

The valve 200 also includes a housing 206 within which a pressure sensor (e.g., pressure sensor 34) is positioned. The valve 200 can be configured to measure pressure or a pressure differential between two different positions along the longitudinal axis 208 as described in greater detail above with reference to the pressure sensor 34.

The valve 200 also includes the field accessible ports 222. The field accessible ports 222 can be positioned proximate the inlet opening 218 of the duct assembly 200. In an exemplary embodiment, the field accessible ports 222 are positioned at a longitudinal position along the longitudinal axis 208 that matches with longitudinal positions of gaskets (e.g., the gaskets 42 and 48 or gaskets 240 and 242 as described in greater detail below with reference to FIG. 13) or of one or more connectors for pressure.

The field accessible ports 222 may include a high pressure port 224 (e.g., a nipple connector or coupler) and a low pressure port 226 (e.g., a nipple connector or coupler). In some embodiments, the high pressure port 224 is positioned upstream of the low pressure port 226. The high pressure port 224 and the low pressure port 226 can be fluidly coupled with a pressure source 232 (e.g., a compressor, a tank of compressed air, a pump, a fan, a blower, etc.) through corresponding tubular members 228 and 230, respectively. The high pressure port 224 and the low pressure port 226 can each be configured to fluidly or sealingly couple with a corresponding inner volume (e.g., an inner chamber) that is defined within an annular member 238. The housing 206 and the pressure sensor therewithin is positioned at or near the annular member 238, and the field accessible ports 222 are also positioned at the annular member 238. The annular member 238 may facilitate defining independent high and low pressure inner volumes or chambers with the radially outwards facing surface (e.g., an exterior surface) of the shell 202. The independent high and low pressure chambers can each be fluidly coupled with an inner volume of the valve 200 (e.g., the inner volume through which the air or fluid flows).

Referring now to FIG. 13, the field accessible ports 222 are shown in greater detail, according to an exemplary embodiment. The high pressure port 224 is configured to fluidly couple with a high pressure chamber 244 that is defined by a first gasket 240 and the shell 202. The low pressure port 226 is configured to fluidly couple with a low pressure chamber 246 that is defined by a second gasket 242 and the shell 202. The first gasket 240 can be the same as or similar to the gasket 42 of the air duct assembly 1 as described in detail above. The second gasket 242 can be the same as or similar to the gasket 48 of the air duct assembly 1 as described in greater detail above.

The first gasket 240 can be configured to sealingly couple with the radially outwards facing surface of the shell 202 in a circumferential direction. The second gasket 242 can be similarly configured to sealingly couple with the radially outwards facing surface of the shell 202 in the circumferential direction. The first gasket 240 (e.g., a radially inwards facing surface of the first gasket 240) and the radially outwards facing surface of the shell 202 may define the high pressure chamber 244. The high pressure chamber 244 may have a circumferential or annular shape and may be a void or an open space that extends along the radially outwards facing surface or the exterior surface of the shell 202. The low pressure chamber 246 can be positioned downstream from the high pressure chamber 244 and may have a similar shape or form as the high pressure chamber 244. For example, the low pressure chamber 246 may be defined by the radially outwards facing surface or the exterior surface of the shell 202 and the second gasket 242 (e.g., a radially inwards facing surface of the second gasket 242). The low pressure chamber 246 can also have a circumferential or annular shape and may be a void or an open space that extends along the radially outwards facing surface or the exterior surface of the shell 202. The first gasket 240 includes a channel or hole 258 through which the high pressure port 224 fluidly couples with the high pressure chamber 244. The second gasket 242 similarly includes a channel or hole 259 through which the low pressure port 226 fluidly couples with the low pressure chamber 246.

The low pressure chamber 246 can have a larger size (e.g., a larger area, a larger volume, etc.) compared to the high pressure chamber 244. The second gasket 242 that defines the low pressure chamber 246 is positioned over an annular groove 266 (e.g., a curved groove, a radially inwards extending portion of the shell 202, a parabolic portion of the shell 202, a curved portion of the shell 202, a concave curvature of the shell 202, a throat of the shell 202, a restriction, a restrictive portion of the shell 202, etc.). The annular groove 266 is a portion of that shell 202 that, along the longitudinal axis 210, curves inwards over a first longitudinal distance to an apex, and then curves outwards over a second longitudinal distance from the apex. The annular groove 266 extends circumferentially about the shell 202. In this way, the first gasket 240 can be positioned over a cylindrically shaped portion of the shell 202, while the second gasket 242 is positioned over a curvature of the shell 202 (e.g., the annular groove 246), thereby resulting in the high pressure chamber 244 having a smaller volume than the low pressure chamber 246. The annular groove 266 can also function as a restriction (e.g., to provide a venturi effect) to adjust the pressure of the air flowing through the inner volume 221 of the valve 200.

In some embodiments, the shell 202 includes a first set of radially spaced openings 234 (e.g., angularly spaced in a circumferential direction about the longitudinal axis 210) and a second set of radially spaced openings 236. The first set of radially spaced openings 234 and the second set of radially spaced openings 236 may be apertures, holes, windows, bore, through-holes, etc., that extend from the corresponding one of the high pressure chamber 244 or the low pressure chamber 246, through the shell 202 to the inner volume 221. In this way, the first set of radially spaced openings 234 can be longitudinally positioned along the longitudinal axis 210 such that the first set of radially spaced openings 234 align with any of the first gasket 240, the high pressure chamber 244, the high pressure port 224, or the tubular member 228. Similarly, the second set of radially spaced openings 236 can be longitudinally positioned along the longitudinal axis 210 such that the second set of radially spaced openings 236 align with any of the second gasket 242, the low pressure chamber 246, the low pressure port 226, or the tubular member 230. The first set of radially spaced openings 234 are positioned longitudinally upstream from the second set of radially spaced openings 236. Each opening or hole of the first set of radially spaced openings 234 and the second set of radially spaced openings 236 may be angularly offset from each other a specific angular amount. The first set of radially spaced openings 234 and the second set of radially spaced openings 236 can be uniformly spaced about a circumference of the shell 202 (e.g., so that adjacent openings of the first set of radially spaced openings 234 or adjacent openings of the second set of radially spaced openings 236 are angularly offset a same amount as another adjacent opening), or may be non-uniformly spaced about the circumference of the shell 202.

Figure 14:
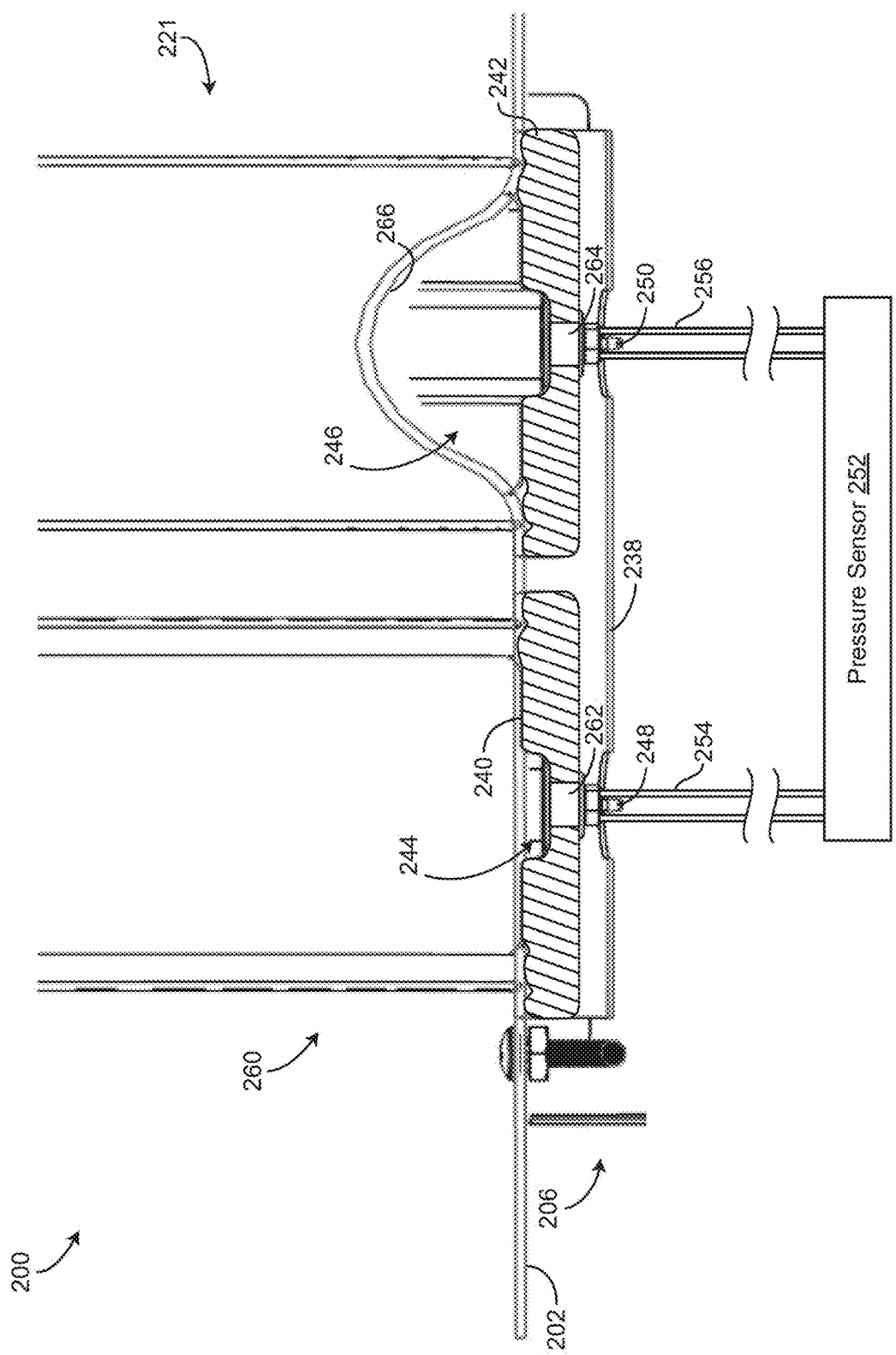
FIG. 14 is a sectional view of another portion of the air duct assembly of FIG. 12, according to some embodiments.

Referring now to FIG. 14, the valve 200 may include a pair of pressure ports for pressure sensing. The pressure ports include a high pressure port 248 and a low pressure port 250. The high pressure port 248 and the low pressure port 250 are positioned at a different radial position along the circumference of the shell 202 relative to the pair of field accessible ports 222. The high pressure port 248 is configured to fluidly couple with the high pressure chamber 244 though the gasket 240. The first gasket 240 includes a channel or hole 262 through which the high pressure port 248 fluidly couples with the high pressure chamber 244. The second gasket 242 includes a channel or hole 264 through which the low pressure port 250 fluidly couples with the low pressure chamber 246.

The high pressure port 248 and the low pressure port 250 are configured to fluidly couple with a pressure sensor 252 through a corresponding tubular member 254 and a tubular member 256. The high pressure port 248 and the low pressure port 250 are configured to fluidly couple with the inner volume 221 similarly to the high pressure port 224 and the low pressure port 226 through the first set of radially spaced openings 234 and the second set of radially spaced openings 236. In this way, the high pressure port 224 and the high pressure port 248 both fluidly couple with the high pressure chamber 244, and the low pressure port 226 and the low pressure port 250 both fluidly couple with the low pressure chamber 246.

It should be understood that while FIG. 13 shows the pressure source 232 fluidly coupled with both the high pressure chamber 244 and the low pressure chamber 246 simultaneously, the pressure source 232 may be coupled to only one of the high pressure chamber 244 and the low pressure chamber 246 at a time, according to some embodiments. For example, a technician may fluidly couple the pressure source 232 with the high pressure chamber 244 (without fluidly coupling the pressure source 232 with the low pressure chamber 246) through the high pressure port 224, and operate the pressure source 232 to perform cleaning of the high pressure chamber 244 and the first set of radially spaced openings 234. The technician may subsequently de-couple the pressure source 232 from the high pressure chamber 244 and proceed with fluidly coupling the pressure source 232 with the low pressure chamber 246 for cleaning the low pressure chamber 246 and the second set of radially spaced openings 236. In this way, the technician may either use the pressure source 232 to clean both the high pressure chamber 244 and the low pressure chamber 246 simultaneously, or may clean the high pressure chamber 244 and the low pressure chamber 246 individually.

Referring to FIGS. 13-14, the pressure ports are configured to receive air from the inner volume 221 to determine a pressure measurement of air flowing through the valve 200. For example, the air may flow through the first set of radially spaced openings 234 and the second set of radially spaced openings 236 into the high pressure chamber 244 and the low pressure chamber 246, respectively. The air may flow through the hole 262 of the first gasket 240, through the high pressure port 248 and the tubular member 254, and into the pressure sensor 252 to obtain a high pressure reading, and simultaneously flow through the hole 264 of the second gasket 242, through the low pressure port 250 and the tubular member 256 and into the pressure sensor 252 to obtain a low pressure reading. In this way, the pressure sensor 252 can detect a high pressure value and a low pressure value (or a pressure differential therebetween) of the air flowing through the valve 200 at different longitudinal positions along the valve 200. The pressure ports can be the same as or similar to the nipple 44 and the nipple 28 as described in greater detail above.

The field accessible ports 222 can be one way valves (e.g., to permit flow only into the high and low pressure chambers) or may be removably fluidly coupled with the pressure source 232 through the tubular members 228 and 230. The pressure source 232 is configured to provide a pressurized air or fluid to the high pressure port 224 and the low pressure port 226 through the first tubular member 228 and the second tubular member 230. The pressurized air then enters the high pressure chamber 244 and the low pressure chamber 246 through the high pressure port 224 and the low pressure port 226, respectively. The pressurized air can then flow through the first set of radially spaced openings 234 and the second set of radially spaced openings 236 from the high pressure chamber 244 and the low pressure chamber 246, respectively, and enter the inner volume 221 of the valve 200. The pressurized air can be used to clean or clear the first set of radially spaced openings 234 and the second set of radially spaced openings 236 by blowing air through the high pressure chamber 244 and the low pressure chamber 246 and the first set of radially spaced openings 234 and the second set of radially spaced openings 236. In this way, air can flow out of the inner volume 221 into the high pressure chamber 244 and the low pressure chamber 246 through the first set of radially spaced openings 234 and the second set of radially spaced openings 236, respectively, for pressure sensing purposes and can be injected in an opposite direction (e.g., into the high pressure chamber 244 and the low pressure chamber 245 and through the first set of radially spaced openings 234 and the second set of radially spaced openings 236 into the inner volume 221) for cleaning or clearing purposes (e.g., to remove obstructions or build-up at any of the first set of radially spaced openings 234, the second set of radially spaced openings 236, the high pressure chamber 244, or the low pressure chamber 246).

It should be understood that as used in the present disclosure, the terms "port" or "coupler" may include or be any opening, fitting, hollow member, aperture, grooves, press-fit openings, etc., configured to selectively fluidly couple an exterior of the valve 200 (e.g., the pressure source 232 and/or the pressure sensor 252) with an interior of the valve 200 (e.g., the high pressure chamber 244 and/or the low pressure chamber 246). The high pressure port 224, the low pressure port 226, the high pressure port 248, or the low pressure port 250 may be any component, opening, fitting, hollow member, aperture, groove, etc., that is integral with or separate from the first gasket 240 and/or the second gasket 242.

Figure 15:
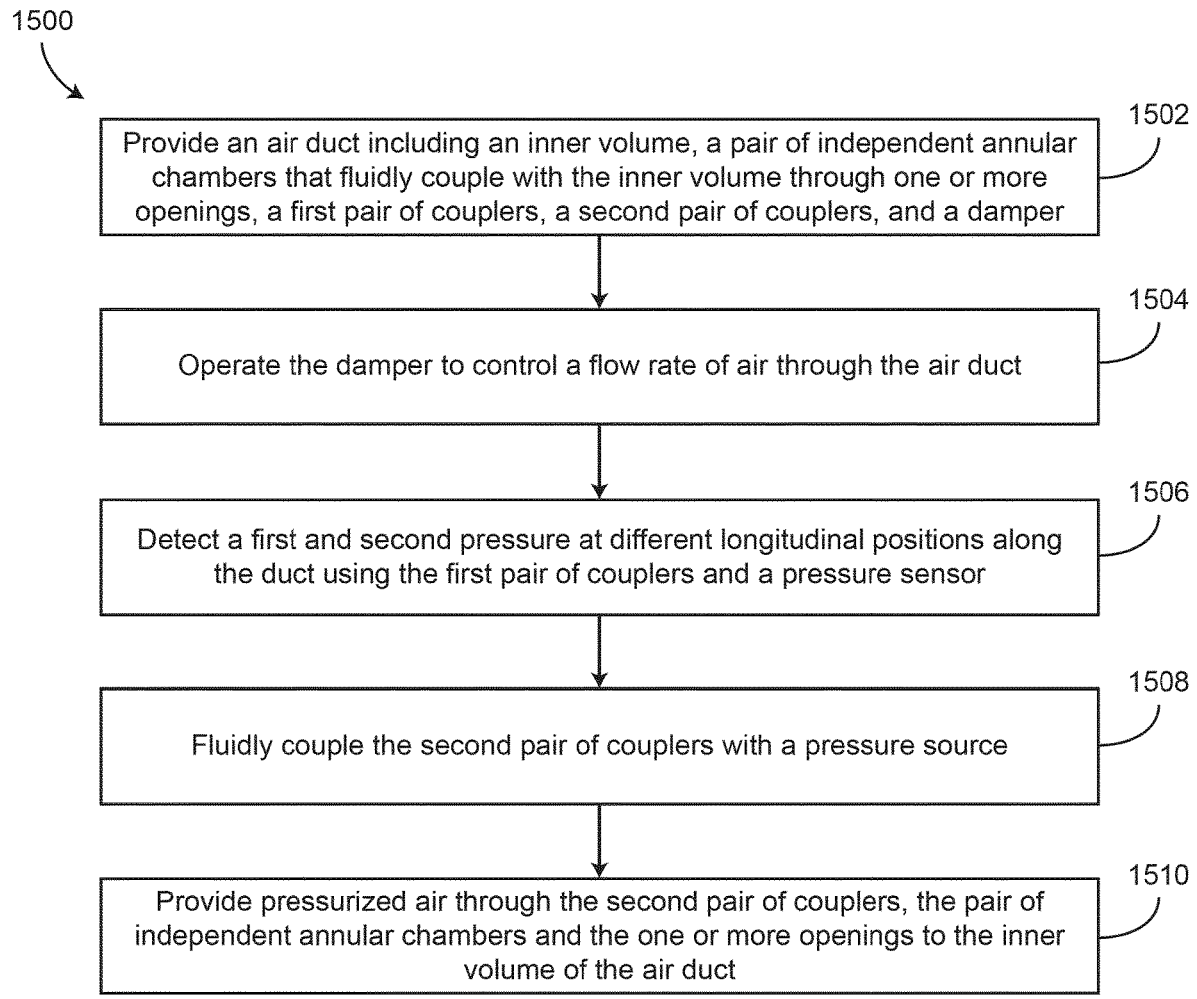
FIG. 15 is a flow diagram of a process for operating and clearing an air duct, according to some embodiments.

Referring now to FIG. 15, a flow diagram of a process 1500 for operating and cleaning an air duct is shown, according to some embodiments. The process 1500 can be performed using the valve 200. The process 1500 can include steps 1502-1510.

The process 1500 includes providing an air duct or a valve including an inner volume, a pair of independent annular chambers that fluidly couple with the inner volume through one or more openings, a first pair of coupler, a second pair of couplers, and a damper (step 1502), according to some embodiments. The air duct may be the same as or similar to the valve 200 as described in greater detail above with reference to FIGS. 12-14. For example, the inner volume may be the inner volume 221, the pair of independent annular chambers may be the high pressure chamber 244 and the low pressure chamber 246, the openings may be the first set of radially spaced openings 234 and the second set of radially spaced openings 236, the first pair of couplers may be the pressure ports, the second pair of couplers may be the field accessible ports 222, and the damper may be the damper 214.

The process 1500 also includes operating the damper to control a flow rate of air through the air duct (step 1504), according to some embodiments. In some embodiments, the damper is operated to adjust (e.g., increase or decrease) a cross-sectional area of the air duct to change air flow, flow rate, or pressure across the valve. Step 1504 can be achieved by operating the actuator 204 to rotate the damper 214 about the axis 207. The damper 214 includes fingers 216 that can engage a radially inwards facing surface of the shell 202, thereby adjusting a cross-sectional flow area of the air duct.

The process 1500 also includes detecting a first and a second pressure at different longitudinal positions along the duct using the first pair of couplers and a pressure sensor (step 1506), according to some embodiments. The first pair of couplers can be configured to sample air at an upstream and a downstream position to detect a pressure at the upstream and the downstream position. The first pair of couplers can each be fluidly coupled with a corresponding one of the pair of independent annular chambers, which are fluidly coupled with the inner volume of the air duct through different sets of the one or more openings. In this way, air flowing through the inner volume of the air duct can be directed through the one or more openings, the pair of independent annular chambers, and the first pair of couplers, which may direct the air from the upstream and downstream position through tubular members to a pressure sensor.

The process 1500 includes fluidly coupling the second pair of couplers with a pressure source (step 1508), according to some embodiments. For example, the second pair of couplers can also fluidly couple with the pair of independent annular chambers and the pressure source. Step 1508 can be performed by a field technician when the air duct should be cleaned or cleared of obstructions. The second pair of couplers can be the field accessible ports 222 and can be accessed from an exterior of the air duct. It should be understood that step 1508 does not need to be performed when the air duct is operating for pressure detection. For example, step 1508 can be performed when the air duct is not powered (when steps 1504-1506 are not being performed), or even when the air duct is not installed in a building. In this way, step 1508 can be performed at any time.

The process 1500 includes providing pressurized air through the second pair of couplers, the pair of independent annular chambers, and the one or more openings, to the inner volume of the duct (step 1510), according to some embodiments. Step 1510 can be performed by operating the pressure source (e.g., the pressure source 232) to provide the pressurized air to the second pair of couplers. Step 1510 can be performed to clear any of the second pair of couplers, the pair of independent annular chambers, the one or more openings, the inner volume of the duct, or the first pair of couplers.

As used in the specification and the appended claims, the singular forms "a," "an" and "the" include plural referents unless the context clearly dictates otherwise.

"Optional' or "optionally" means that the subsequently described event or circumstance may or may not occur, and that the description includes instances where said event or circumstance occurs and instances where it does not.

Throughout the description and claims of this specification, the word "comprise" and variations of the word, such as "comprising' and "comprises," means "including but not limited to," and is not intended to exclude, for example, other additives, components, integers or steps. "Exemplar" means "an example of" and is not intended to convey an indication of a preferred or ideal embodiment. "Such as" is not used in a restrictive sense, bur for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combination and permutation of these may not be explicitly disclosed, each is specifically contemplated and described herein, for all methods, equipment and systems. This applies to all aspects of this application including, but not limited to, steps in disclosed methods. Thus, if there ae a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. An air duct comprising:
    a shell;
    a first annular chamber defined along a circumference of the shell and fluidly coupled with an inner volume defined by the shell through a plurality of first openings;
    a second annular chamber defined along the circumference of the shell at a longitudinal position downstream of the first annular chamber, the second annular chamber fluidly coupled with the inner volume through a plurality of second openings;
    a first pressure sensing coupler fluidly coupled with the first annular chamber and a second pressure sensing coupler fluidly coupled with the second annular chamber for pressure detection; and
    a first field accessible coupler fluidly coupled with the first annular chamber and a second field accessible coupler fluidly coupled to the second annular chamber for providing pressurized air to the first annular chamber and the second annular chamber.

2. The air duct of claim 1, wherein the shell is a cylindrical hollow member.

3. The air duct of claim 1, wherein the second annular chamber is positioned at a restricted cross-sectional flow area of the shell.

4. The air duct of claim 1, further comprising:
    a first annular gasket sealingly coupled with a radially outwards facing surface of the shell to define the first annular chamber between one or more interior surfaces of the first annular gasket and the radially outwards facing surface of the shell; and
    a second annular gasket sealingly coupled with the radially outwards facing surface of the shell to define the second annular chamber between one or more interior surfaces of the second annular gasket and the radially outwards facing surface of the shell.

5. The air duct of claim 1, wherein the first and second field accessible couplers are each open to and accessible from an exterior of the air duct.

6. The air duct of claim 5, wherein the first and second field accessible couplers are configured to fluidly couple with a pressure source configured to:
    provide the pressurized air to flow through the first annular chamber and the plurality of first openings to clear obstructions; and
    provide the pressurized air to flow through the second annular chamber and the plurality of second openings to clear obstructions.

7. The air duct of claim 1, wherein the first and second pressure sensing couplers are fluidly coupled with a pressure sensor of the air duct for detecting pressure values or a pressure differential between the first and second pressure sensing couplers.

8. The air duct of claim 1, wherein air flowing through the air duct flows through the plurality of first openings, the first annular chamber, the second annular chamber, and the first and second pressure sensing couplers in a first direction for pressure detection, and the pressurized air flows through the plurality of second openings, the first and second field accessible couplers, the first annular chamber, and the second annular chamber in a direction opposite the first direction for cleaning.

9. The air duct of claim 1, further comprising a damper and an actuator, wherein the actuator is configured to drive the damper to adjust a flow rate of air through the air duct.

10. An air duct comprising:
    a shell;
    a first annular chamber defined along a circumference of the shell and fluidly coupled with an inner volume of the shell through a plurality of first openings;
    a second annular chamber defined along the circumference of the shell at a longitudinal position that is downstream of the first annular chamber, the second annular chamber fluidly coupled with the inner volume of the shell through a plurality of second openings; and
    a first field accessible coupler fluidly coupled with the first annular chamber for providing pressurized air to the first annular chamber;

a second field accessible coupler fluidly coupled coupled with the second annular chamber for providing pressurized air to the second annular chamber;

a first pressure sensing coupler fluidly coupled with the first annular chamber and a second pressure sensing coupler fluidly coupled with the second annular chamber for pressure detection; and wherein the second annular chamber is partially defined by an annular groove extending circumferentially along the shell, the annular groove extending inwards towards a longitudinal axis of the air duct.

11. The air duct of claim 10, wherein the second annular chamber is positioned at the annular groove of the shell.

12. The air duct of claim 10, further comprising:
a first annular gasket sealingly coupled with a radially outwards facing surface of the shell to define the first annular chamber between one or more interior surfaces of the first annular gasket and the radially outwards facing surface of the shell; and
a second annular gasket sealingly coupled with the radially outwards facing surface of the shell to define the second annular chamber between one or more interior surfaces of the second annular gasket and the radially outwards facing surface of the shell.

13. The air duct of claim 10, wherein the first field accessible coupler and the second field accessible coupler are configured to fluidly coupled with a pressure source.

14. The air duct of claim 13, wherein the pressure source is configured to:
provide the pressurized air to flow through the first annular chamber and the plurality of first openings to clear obstructions; and
provide the pressurized air to flow through the second annular chamber and the plurality of second openings to clear obstructions.

15. The air duct of claim 10, further comprising first and second pressure sensing couplers that are independently fluidly coupled with the first annular chamber and the second annular chamber and a pressure sensor of the air duct for detecting pressure values or a pressure differential between the first annular chamber and the second annular chamber.

16. The air duct of claim 10, wherein the shell is a cylindrical hollow member comprising the annular groove.

17. The air duct of claim 16, wherein the annular groove defines a restricted cross-sectional flow area of the shell along the annular groove.

18. A method, the method comprising:
providing a shell for an air duct including an inner volume, first and second independent annular chambers that independently fluidly couple with the inner volume through a first set of openings and second set of openings, and first and second field accessible couplers;
fluidly coupling at least one of the first and second field accessible couplers with a pressure source; and
providing pressurized air through the first field accessible coupler, the first annular chamber, and the first set of openings and the second field accessible coupler, the second annular chamber, and the second set of openings.

19. The method of claim 18, wherein the air duct further comprises first and second pressure sensing couplers and the method further comprises:
adjusting a position or configuration of a damper to control a flow rate of air through the air duct; and
detecting a pressure differential between longitudinal positions of the first and second annular chambers using the first and second pressure sensing couplers and a pressure sensor.

20. The method of claim 19, wherein the first and second pressure sensing couplers are independently fluidly coupled with the first and second annular chambers at a first radial position, and the first and second field accessible couplers are independently fluidly coupled with the first and second annular chambers at a second radial position, wherein air is configured to flow through the inner volume, the first set of openings and the second set of openings, the first and second independent annular chambers, and the first and second pressure sensing couplers in a first direction for pressure detection, and to flow through the first and second field accessible couplers, the first and second annular chambers, the first set of openings and the second set of openings, to the inner volume in a second direction that is opposite the first direction for clearing obstructions.

* * * * *